United States Patent
Bordes

(10) Patent No.: US 6,223,897 B1
(45) Date of Patent: May 1, 2001

(54) METHOD AND APPARATUS FOR ORGANIZING AND STORING BILLS

(76) Inventor: Michel A. Bordes, 4929 Hackney La., The Colony, TX (US) 75056

(*) Notice: Subject to any disclaimer, the term of this patent is extended or adjusted under 35 U.S.C. 154(b) by 0 days.

(21) Appl. No.: 09/439,319

(22) Filed: Nov. 12, 1999

(51) Int. Cl.⁷ .......................... B65D 85/00; B65D 30/22; G06F 17/60
(52) U.S. Cl. .......................... 206/425; 206/232; 383/39; 705/34; 705/40
(58) Field of Search .................... 383/39, 40, 9, 383/10; D19/26, 86; D3/303; 206/232, 425; 705/34, 40

(56) References Cited

U.S. PATENT DOCUMENTS

| | | |
|---|---|---|
| 259,410 | 6/1882 | Marmaduke . |
| D. 278,445 | 4/1985 | Hartney . |
| D. 363,950 | 11/1995 | Brüssing . |
| D. 369,025 | 4/1996 | Miller et al. . |
| D. 398,648 | 9/1998 | Matthews . |
| 770,354 | 9/1904 | Corfman . |
| 1,416,238 | 5/1922 | Seiler . |
| 1,431,032 | 10/1922 | Patzkowski . |
| 1,495,220 * | 5/1924 | Carroll .................................. 383/39 |
| 1,498,455 | 6/1924 | Johnson . |
| 1,560,442 * | 11/1925 | Trombridge ........................ 383/40 X |
| 3,154,125 * | 10/1964 | Harvey ................................ 229/67.1 |
| 3,207,421 | 9/1965 | Hunger et al. . |
| 4,388,958 | 6/1983 | Dworkin . |
| 4,901,899 | 2/1990 | Barrett . |
| 4,934,833 * | 6/1990 | Linder .............................. 383/902 X |
| 4,991,980 | 2/1991 | Cohen et al. . |
| 5,025,918 * | 6/1991 | Bergeron ............................ 383/39 X |
| 5,062,530 * | 11/1991 | Mitsuyama ........................... 206/425 |
| 5,097,961 | 3/1992 | Patino . |
| 5,351,813 | 10/1994 | Golovan . |
| 5,412,886 | 5/1995 | Quinn . |
| 5,560,693 | 10/1996 | Musser et al. . |
| 5,775,521 | 7/1998 | Tisbo . |
| 5,779,033 | 7/1998 | Roegner . |
| 5,797,204 | 8/1998 | Paulos . |
| 5,813,539 | 9/1998 | De Palma . |

* cited by examiner

Primary Examiner—Bryon P. Gehman
(74) Attorney, Agent, or Firm—John F. Bryan

(57) ABSTRACT

Apparatus for organizing bills has a flexible backing and a plurality of compartments for individual accounts, each compartment having an inner section for paid bills and an outer section for unpaid bills, wherein the inner section has sufficiently expansive capacity to hold all of the billings on an individual account for a twelve month period and the outer section includes a transparent window to allow viewing its contents.

11 Claims, 3 Drawing Sheets

FIG. 6
FIG. 7
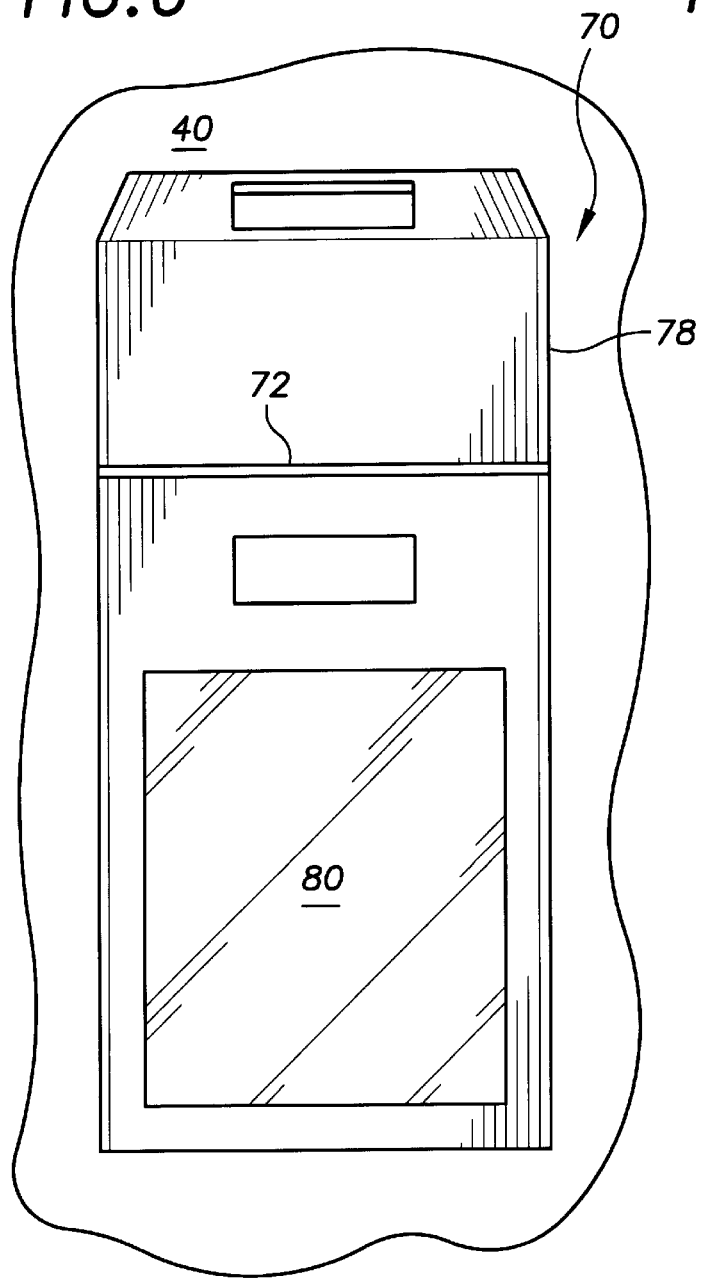
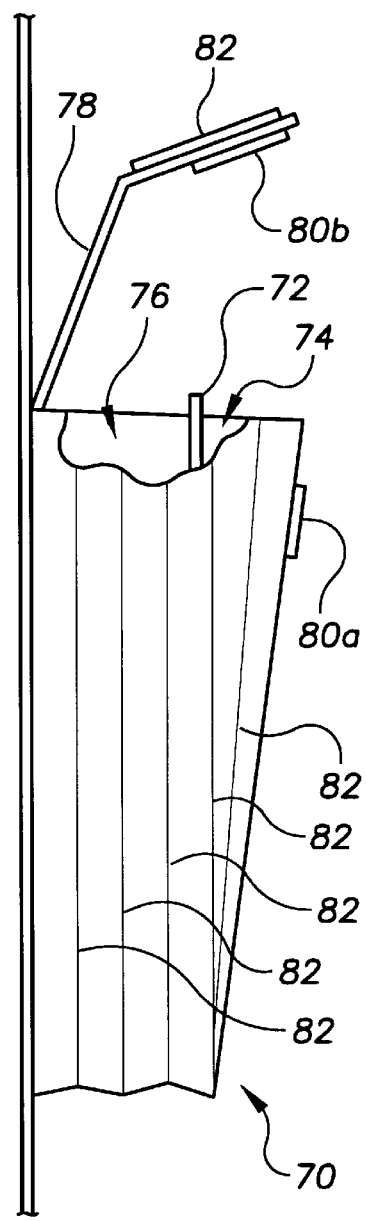

METHOD AND APPARATUS FOR ORGANIZING AND STORING BILLS

TECHNICAL FIELD

The present invention relates to the field of compartmented organizing systems and particularly, to such systems as adapted to organizing bills for payment and storing thereof for future retrieval.

BACKGROUND OF THE INVENTIONS

Every household or small business has a monthly aggregation of invoices and statements for various operating accounts. Not only should these bills be paid in a timely manner but, after payment, they should be filed for reference purposes in tax preparation and then stored so as to be available if needed in an audit. The responsible household or business manager creates a personal system that satisfies his or her perceived need. One manager's personal system may be keeping two stacks, one for unpaid bills and the second for paid bills, while another's system might use a separate file folder for each unpaid and paid account.

Computers and versatile software have simplified the tasks of bookkeeping and financial management, but there has not been any parallel progress in managing the accounting "paper trail". In a perfect world, the paper might be discarded once the date, transaction number, and amount is entered into the computer. However, the perfect world does not contemplate such things as accidental oversight, entry errors and audits.

Therefore, a first object of the present invention is to provide an improved method and apparatus for organizing bills. A second object is that the improved apparatus include a visible reminder of pending, unpaid bills. A third object is that the improved apparatus provide integral packaging for long term storage and retrieval of bills paid during a fiscal year.

SUMMARY OF THE INVENTIONS

The present inventions contemplate improved methods and apparatus for organizing bills for payment and for storage of the paid bills for record and tax purposes. Practice of the present inventions relates to or uses some steps and apparatus well known in the accounting arts and therefore, not the subject of detailed discussion herein.

The present invention comprises apparatus for organizing and storing paid and unpaid bills on accounts. The apparatus has a flexible backing, to which a plurality of compartments for individual accounts are attached in an array of rows. Each compartment has an inner section for paid bills and an outer section for unpaid bills. The inner section has sufficient capacity to hold all of the individual account billings for a twelve month period, and the outer section includes a transparent window to allow viewing the contents thereof. The apparatus is preferably configured for hanging on a prominent vertical surface, where is it viewed routinely by the individual responsible for accounts payable.

BRIEF DESCRIPTION OF THE DRAWINGS

The accompanying drawings are incorporated into and form a part of the specification to assist in explaining the present inventions. The drawings illustrate preferred and alternative examples of how the inventions can be made and used, and are not to be construed as limiting the inventions to only those examples illustrated and described. The various advantages and features of the present inventions will be apparent from the drawings in which:

FIG. 6 shows a front view of a typical compartment in the embodiment of FIG. 1 as it appears when open; and FIG. 7 shows a side view of the compartment of FIG. 6.

DETAILED DESCRIPTION OF THE DRAWINGS

Figure 1:
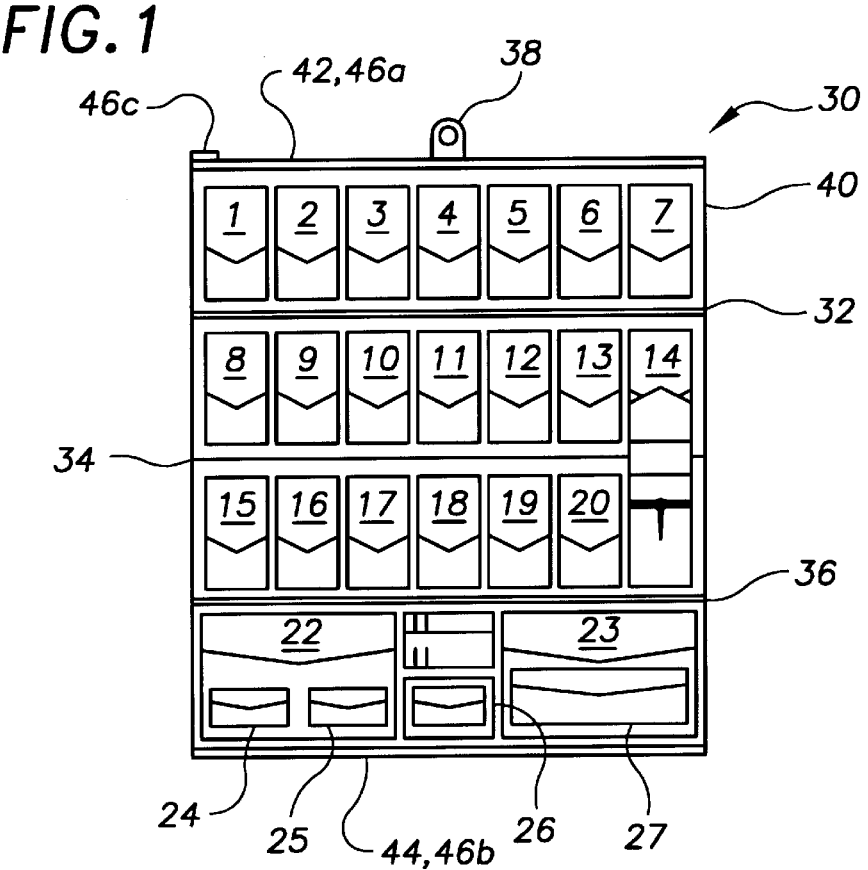
FIG. 1 shows a frontal view of a first preferred embodiment of the present inventions.

The embodiments shown above and described herein are exemplary. Many details are well known in the art, and as such are neither shown nor described. It is not claimed that all of the details, parts, elements, or steps described and shown were invented herein. Even though numerous characteristics and advantages of the present inventions have been described in the drawings and accompanying text, the description is illustrative only, and changes may be made in the detail, especially in matters of shape, size, and arrangement of the parts within the principles of the inventions to the full extent indicated by the broad general meaning of the terms used in the attached claims.

Figure 2:
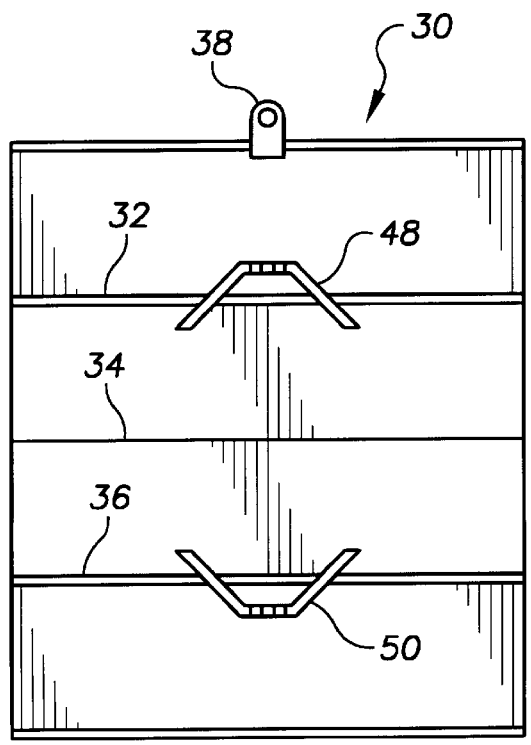
FIG. 2 shows a rear view of the preferred embodiment of FIG. 1.
Figure 4:
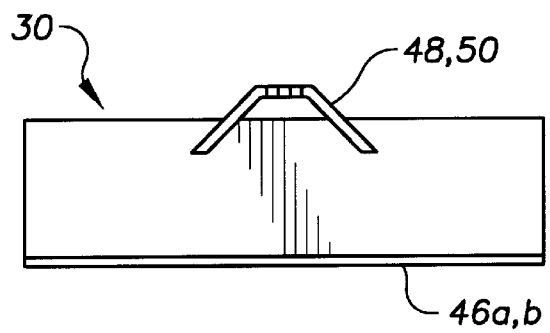
FIG. 4 shows the embodiment of FIG. 1 as it appears when folded.

FIGS. 1 and 2 are illustrative of forms expressing embodiments of the present inventions. FIG. 1 is a frontal view of a preferred bill organizer embodiment 30 of the present inventions and FIG. 2 is a rear view of the same embodiment. An array of rows of compartments 1–27 are affixed to the front surface of backing 40, which is preferably of a flexible nature, so as to be foldable between rows of compartments, along bend lines 32, 34 and 36. Loop 38 is attached to upper end 42 of backing 40, to permit temporary hanging attachment against a vertical surface, such as a wall. In this manner, bill organizer 30 is readily available for viewing by the user. Upper end 42 is edged with one side 46a of zipper type fastener 46, including meshing slider 46c. Lower end 44 is edged in a like manner with the mating second half 46b of zipper type fastener 46. This zipper arrangement serves to join upper end 42 to lower end 44 to provide a compact package for carrying or storage as shown in FIG. 4. This feature also allows two or more units of bill organizer to be adjoined end-to-end, should additional capacity be required. In a rear view of bill organizer 30, FIG. 2 also shows bend lines 32, 34 and 36 and loop 38. Also seen in this view are carrying handles 48 and 50, the function of which is discussed below.

Figure 3:
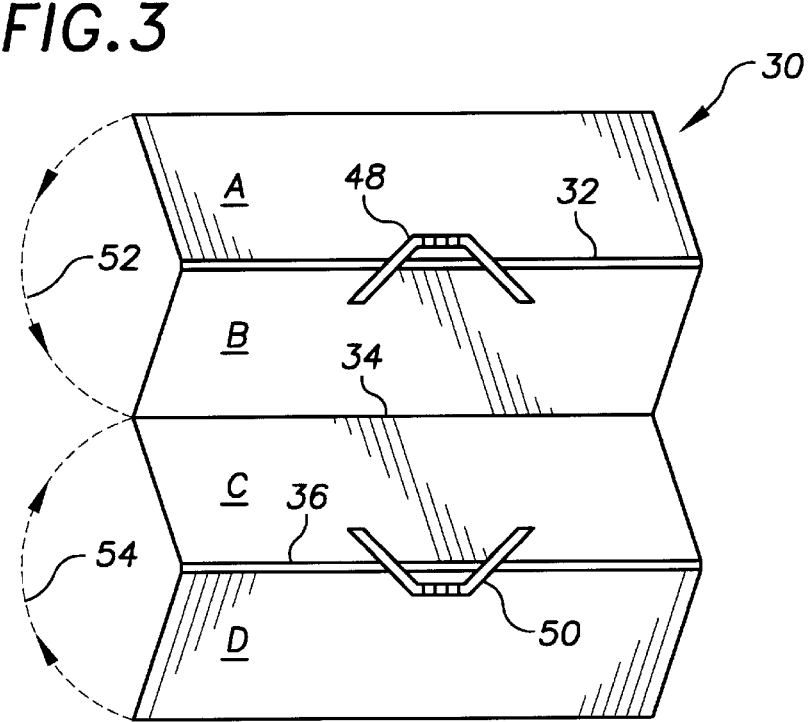
FIG. 3 shows the embodiment of FIG. 1 as it appears in the process of being folded.

FIG. 3 depicts the manner of folding bill organizer 30, along bend lines 32, 34 and 36, for convenience in carrying or for storage. Sections A, B, C and D of backing 40 fold along bend lines 32, 34 and 36, as shown by arrows 52 and 54. The folding allows handles 48 and 50 to come together and zipper sides 46a and 46b of zipper assembly 46 to be joined together as indicated in FIG. 4.

Figure 5:
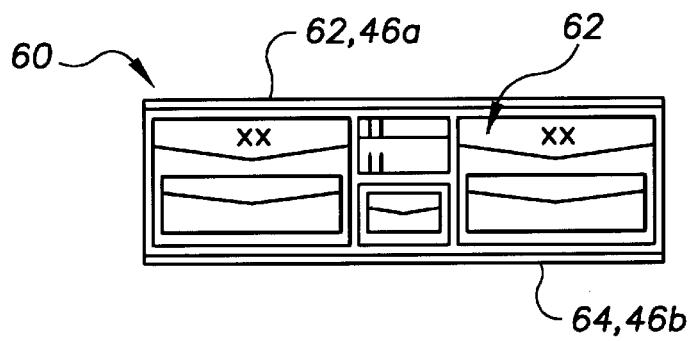
FIG. 5 shows a preferred embodiment of an extension module for attaching additional compartments to the embodiment of FIG. 1.

FIG. 5 shows add-on module 60, which has array 62 of additional similar compartments. Add-on section 60 includes upper end 62, edged with another side 46a of zipper type fastener 46, including meshing slider 46c. Lower end 64 may be edged in a like manner, with the mating second half 46b of zipper type fastener assembly 46. This zipper arrangement allows attachment of two or more units of add-on section 60, to expand the capacity of bill organizer 30, as the user requires.

FIGS. 6 and 7 show a typical compartment 70, attached to backing 40, and including internal partition 72. Partition 72 divides the interior of compartment 70 into outer compartment section 74 and inner compartment section 76. Compartment 70 also includes a transparent window 80, arranged to allow viewing of the contents of outer compartment section 74. Thus, current invoices placed in outer compartment section 74 are visible to the user until paid. Upon payment, the paid invoices are transferred to inner compartment section 76. Inner compartment section 76 has sufficient capacity to hold the paid invoices for at least 12 months, so that the entire paper record for a fiscal year can be transported, stored and retrieved as a single package. Flap 78 is provided to close compartment 70 and is made so as to not obscure viewing the contents of outer compartment section 74 when compartment 70 is closed. Accordion pleat lines 82 allow expansion of compartment 70 as necessary. Hook and loop VELCRO fastening strips 80*a* and 80*b* are adhesively attached to compartment 70 and flap 78 respectively, to secure flap 78 in the closed position when appropriate. Slip-in label holder 82 is included on the outwardly facing surface of flap 78 for the purpose of identifying the compartment for a specific account.

The restrictive description and drawings of the specific examples above do not point out what an infringement of this patent would be, but are to provide at least one explanation of how to use and make the inventions. The limits of the inventions and the bounds of the patent protection are measured by and defined in the following claims.

I claim:

1. Apparatus for organizing and storing paid and unpaid bills on accounts comprising:

a foldable backing;

a plurality of individual compartments, each labeled for an individual account, and separately attached to said backing, each compartment having an expansible inner section holding paid bills and an outer section holding unpaid bills, wherein said inner section has accordion pleated side walls to provide increased capacity for all of the bills paid over a twelve month period on an individual account; and a transparent window included in said outer section to allow viewing of said unpaid bills contained therein.

2. Apparatus for organizing and storing paid and unpaid bills on accounts according to claim 1 and further comprising:

upper and lower backing edges giving said backing a generally rectangular form; and one side of a zipper assembly included in at least one of said edges.

3. Apparatus for organizing and storing paid and unpaid bills on accounts according to claim 2, wherein said one side of a zipper assembly is included on said lower edge, and further comprising:

an add-on backing having upper and lower ends; and a second side of a zipper assembly included in at least said upper edge, said second zipper side being configured to engage with said one zipper side.

4. Apparatus for organizing and storing paid and unpaid bills on accounts according to claim 2, wherein said one side of a zipper assembly is included on each of said lower and upper edges and are configured to be joined together for carrying or storing the apparatus.

5. Apparatus for organizing and storing paid and unpaid bills on accounts according to claim 1 and further comprising:

upper and lower backing edges giving said backing a generally rectangular form; and a loop attached at the approximate center of said upper edge to provide an attachment for hanging said apparatus on a vertical surface.

6. Apparatus for organizing and storing paid and unpaid bills on accounts according to claim 1 and further comprising:

upper and lower backing edges giving said backing a generally rectangular form; and an arrangement of said compartments in parallel rows, said backing being foldable along lines between adjacent rows.

7. Apparatus for organizing and storing paid and unpaid bills on accounts according to claim 1 and further comprising:

an opening for each said compartment; and a flap proximate said opening, attached so as to close said compartment when in a first position and allow access to said compartment when in a second position.

8. A method of organizing and storing paid and unpaid bills in an array of rows of compartments wherein each compartment has an inner and an outer section comprising the steps of:

labeling each compartment to correspond with an assigned account;

placing each unpaid bill in the outer compartment section labeled to correspond with the account of that bill;

displaying the unpaid bills in outer compartment sections to external view;

removing each unpaid bill from its respective outer compartment section when paid and transferring that paid bill to the corresponding inner compartment section;

accumulating the paid bills in this manner until the bills paid during a given fiscal period have been accumulated in the respective inner compartment sections;

folding the array of compartments, row upon row, into a compact package for storage; and storing the paid bills for the given fiscal period until needed for future reference.

9. The method of organizing and storing paid and unpaid bills according to claim 8 wherein the step of displaying further comprises hanging the array of compartments on a vertical surface.

10. The method of organizing and storing paid and unpaid bills according to claim 8 and further comprising:

adding an additional row of compartments with inner and an outer sections to the aforementioned array of rows.

11. The method of organizing and storing paid and unpaid bills according to claim 8 wherein the step of folding further comprises closing the compartments.

* * * * *